Patented Oct. 30, 1951

2,573,072

UNITED STATES PATENT OFFICE 2,573,072

PRODUCTION OF VEGETABLE PROTEIN

Bruno Vassel, Toledo, Ohio, assignor to International Minerals and Chemical Corporation, a corporation of New York No Drawing. Application November 7, 1947, Serial No. 784,755

13 Claims. (Cl. 260—123.5)

The present invention relates to a novel process for the production and purification of valuable constituents of flaxseed. More particularly the invention relates to the production and isolation of mucilaginous substances, linseed oil, and proteinaceous substances from flaxseed.

The recovery and utilization of proteins from cereals, grains, and other vegetable sources, and their subsequent use in the preparation of intravenous protein hydrolysates, glues, cold water paints, paper sizing and protein plastics has been widespread and of great importance. Until recently the various industries using such materials have turned to vegetable proteins which are derived from soy beans, cotton seed, peanuts and, for certain specialized purposes, wheat and corn glutens. It has also been known for some time that the protein content of oil-free flaxseed varies between about 40 and about 50%. However, progress in the recovery of the proteinaceous substances from flaxseed has been retarded due to numerous factors. Probably the main difficulty resides in the fact that flaxseed contains appreciable amounts of mucilage (between about 5 and about 7%) and this material seriously interferes with the extraction of proteinaceous substances from the flaxseed and also hampers further purification processes which involve this proteinaceous material. Several methods have been devised by previous workers for the extraction of the mucilaginous substances from flaxseed in an effort to reduce the mucilage content of the flaxseed to a minimum prior to the extraction of the protein. Some workers have proposed the extraction of mucilage with water but it has been found that this method extracts only about 33% of the total mucilaginous substances from the flaxseed. Several other methods which have been proposed involve the mechanical treatment of the flaxseed whereby it is sought to remove the hulls, which contain substantially all of the mucilaginous substances of the flaxseed, by either careful grinding, pressing, or abrasion. None of these methods has achieved a required degree of success, due to the fact that the seeds are quite delicate in structure and any mechanical method which is capable of removing the hulls usually disrupts the kernel or embryo of the seed. As a result, a substantial portion of the mucilaginous substances remain in the flaxseed and are extracted with the proteinaceous substances by means which are familiar to those skilled in the art of processing vegetable seed. The usual solvents employed for the extraction of the proteinaceous substances from such seed include dilute alkaline solutions, such as solutions of sodium or potassium hydroxides; salt solutions, such as dilute sodium chloride solutions; or dilute solutions of mineral acids such as sulfuric or hydrochloric acids. Unfortunately the mucilaginous substances are also extracted with the proteinaceous substances when such reagents are employed, and the resulting protein solutions contain both dissolved and suspended mucilaginous substances which greatly increase the viscosity of the protein solutions and render their filtration quite difficult. The recovery of the proteinaceous substances from such solutions is usually achieved by adjusting the pH of the solution to the isoelectric point of the desired protein followed by filtration of the precipitated product. Here, again, the mucilage content of the solution not only greatly interferes with the filtration of the solution containing the precipitated protein, but also considerably contaminates the desired product and renders it difficult of purification.

The processors of flaxseed are presently finding an outlet for the substantially oil-free linseed meal in animal feeds and some poultry feeds. It has been found, however, that the amount of linseed meal which is permissible in such feeds is distinctly limited. For example, it has been found that linseed meal is not suitable for chicken rations, presumably because the high mucilage content of the meal causes digestive disturbances. It has also been found that not more than 20% of linseed meal can be used in cattle and swine rations because occasionally a toxic substance is present therein which is said to be a cyanoglucoside. From these observations it is obvious that the use of linseed meal in feed rations is rather limited and any process which would eliminate substantially all the mucilaginous substances from linseed meal would result in a substantially increased market for such a product.

It is an object of the present invention to provide a novel process for the extraction of mucilaginous substances from flaxseed.

It is a further object of the invention to provide a novel process whereby the mucilaginous substances of flaxseed will be extracted therefrom substantially free from protein.

It is a further object of the invention to provide a novel process whereby the proteinaceous substances of flaxseed may be recovered therefrom substantially free from flaxseed mucilage values.

It is a further object of the invention to provide linseed meal which is substantially free from flaxseed mucilaginous substances.

It is a further object of the invention to provide a novel process whereby the mucilaginous substances, vegetable oil, and proteinaceous substances of flaxseed may be obtained in such condition that each of these products is substantially free from any of the other named products.

The above objects as well as others which will become apparent upon a more complete understanding of the invention which is hereinafter set forth are achieved by subjecting whole flaxseed to the action of a reagent taken from the group consisting of dilute alkaline and dilute acidic solutions. It has now been found that when whole flaxseed is subjected to the aforementioned reagents, the mucilaginous substances of the flaxseed, which reside in the hull of the seed, are extracted therefrom; and by suitably regulating the alkalinity or acidity of the reagents, as well as other factors which will be subsequently described, it is possible to extract the said mucilaginous substances substantially in the absence of the proteinaceous substances of the flaxseed.

By the term "whole flaxseed" is meant the seed as it is obtained from the mechanical flaxseed separating devices. Such seed still contains its entire oil content as well as the unbroken hull which protects the germ or embryo.

By the term "dilute alkaline and acidic solutions" is meant solutions containing not more than 10% by weight of an acidic or alkaline reagent of the type hereinafter described.

It has further been found that when whole flaxseed is subjected to the action of either dilute alkaline or dilute acidic solutions, the solid mucilage-free product which results can be recovered and dried at suitable temperatures, and the linseed oil extracted from the substantially mucilage-free seed either by means of expression by pressure means, or by solvent extraction. The resultant oil-free solid product may be treated with alkaline solutions in order to extract the proteinaceous substances therefrom. This protein extraction is accomplished by methods which are old in the art, for example by extraction with dilute sodium hydroxide solutions at a pH between 10 to 11. The resultant alkaline solutions are acidified by means of any suitable acidic reagent to a pH of between 3.5 to 6.0. The pH value to which the solution is adjusted depends upon the isoelectric point of the desired protein. It has been found that the precipitated protein obtained by employing the instant novel process can be readily filtered and purified due to the almost complete absence of the mucilaginous substances which heretofore have rendered such operations extremely difficult.

More particularly, the instant novel process involves subjecting whole flaxseed one or more times to the action of either a dilute alkaline or dilute acidic solution, preferably at a temperature below 100° C. A suitable pH range for the alkaline solutions is between about 8.0 and about 12.0, and a suitable pH range for the acidic solutions is between about 0.5 and about 4.0. These pH ranges may also be expressed as normalities of the corresponding solutions and it has been found that an acidic or alkaline solution which contains between about 0.01 and about 2.5 equivalents (normality) of an appropriate acidic or alkaline reagent is suitable for carrying out the mucilage extracting step of the process.

The methods of extracting the mucilage values from whole flaxseed by means of acidic or alkaline solutions may embody any convenient means for carrying out such an operation provided that the hull is not removed from the seed or its structure seriously impaired. Among the methods applicable may be mentioned the following:

1. Steeping the seed in the solvent.
2. Agitating the seed in a slurry in the solvent using a mechanical stirring device or a stream of gas inert with respect to the solution.
3. Circulating the solvents through a fixed bed of whole flaxseed.

Examples of dilute acidic solutions which are applicable as mucilage extracting solvents are dilute hydrochloric, sulfuric, sulfurous, phosphoric, nitric, acetic and formic acids and mixtures of these acids. As previously mentioned, the pH of the acidic solution should be maintained between about 0.5 and about 4.0, which may be alternately expressed as normality between about 0.01 and about 2.5. While dilute solutions of the aforementioned acids and mixtures thereof are highly desirable as solvents for the mucilage extracting process, it is to be understood that the acidic solutions may contain other appropriate components such as neutral, acidic, or alkaline reacting salts. Alternatively, the mucilage extraction solvent may contain only salts which are acidic or alkaline in aqueous solutions. For example, sodium bisulfite, aluminum chloride, ammonium chloride, disodium phosphate, trisodium phosphate, sodium bisulfite, sodium sulfite, etc. It has also been found that the lower aliphatic water-miscible sulfonic acids such as $$CH_3CH_2SO_3H$$

and sulfates such as $CH_3CH_2OSO_3H$, the lower aliphatic phosphonic acids such as $CH_3CH_2PO_3H$, and phosphoric acids such as $CH_3CH_2PO_3H_2$ and their water-soluble esters are excellent reagents or solvents for mucilage extraction. Similarly, the lower molecular weight water-miscible amines and polyamines such as $CH_3NH_2$, $(CH_3)_2NH$, $(CH_3)_3N$, $CH_3CH_2NH_2$, $H_2NCH_2CH_2NH_2$, pyridine, etc. would be suitable. It has been found that the water-soluble aromatic sulfonic acids are also applicable. All of the aforementioned reagents and equivalents thereof are deemed to be within the scope of the appended claims which define the invention.

Examples of inorganic alkaline reagents which are suitable for the preparation of dilute alkaline mucilage extraction solvents are sodium hydroxide, potassium hydroxide, and mixtures thereof, etc.

As previously mentioned, the temperature of the mucilage extracting solution or mucilage solvent should not exceed 100° C. and if substantially protein-free mucilage is desired, the temperature is maintained not above 50° C., and preferably at room temperature or about 25° C. At temperatures above 50° C. it has been found that protein degradation occurs in progressively increasing amounts and if the protein values are to be subsequently recovered, this should obviously be avoided.

The amount of mucilage extracting solvent may be varied between about 5 and about 18 volumes of solvent per unit weight of flaxseed. It has been found that when the larger volumes of mucilage extracting solvents are employed that a higher percentage of the mucilage is extracted in a single treatment of the flaxseed. When smaller volumes of mucilage extracting solvents are employed it is usually desirable to extract the seed two or three times in order to obtain the maximum yield of mucilage. Furthermore the more dilute extracts are usually more easily filtered or centrifuged and lower in viscosity then the more concentrated extracts.

Where alkaline mucilage extracting solvents are used, it appears that a 4 hr. contact period of said solvent with the flaxseed is sufficient when about 10 volumes of said solution to one unit weight of flaxseed are employed. As will appear in subsequent examples, the percent of mucilage extracted by any particular alkaline solution after an interval of 31 hrs. is not much greater than the mucilage obtained after a 4 hr. extraction. However, the yield of mucilage after a 4 hr. period is about 50% higher than that obtained after a 1 hr. extraction. In the case where acidic solutions are employed for the extraction of the mucilaginous substances, the period of time required to obtain optimum yields of mucilaginous substances from the flaxseed is considerably longer than in the case of alkaline solutions. As will appear in subsequent examples, the yield of extracted mucilaginous substances in the case of a particular acidic solution may be increased about 300% by extracting the flaxseed with said solution for a period of about 16 to 31 hrs. as compared with an extraction period of about 1 hr.

It will be obvious from the above discussion that the yield of mucilage obtained in any given extraction of whole flaxseed will be dependent upon the percent acidity or alkalinity of the extracting solvent, ratio of the volume of solvent per unit weight of flaxseed, and the time of contact employed for the extraction. The examples which will be subsequently herein set forth will illustrate these factors more specifically.

The mucilaginous substances which have been obtained by extraction of the whole flaxseed with the aforementioned reagents may be isolated by first adjusting the pH of the mucilage solution to about 8.5, adding several volumes of a water-miscible organic solvent, such as methyl alcohol, ethyl alcohol or acetone, and allowing the resulting solution to stand for several hours. The mucilaginous substances precipitate slowly from these solutions and may be centrifuged, or filtered by suitable means, for example on a filter press or basket type centrifuge.

The substantially mucilage-free flaxseed is washed in order to remove the excess of either alkaline or acidic reagent. This may be accomplished by using water until the effluent is approximately neutral, or by employing either dilute acidic or alkaline solutions as wash water for the alkaline or acid extracted seed, respectively, until a condition of neutrality of the seed is obtained. The washed seed is dried at a temperature not in excess of 50° C. It has been found that if the temperature exceeds 50° C. during the drying period, the proteinaceous substances of the flaxseed undergo decomposition or degradation, thereby decreasing the value of the flaxseed as a protein-containing or protein-producing product. The preferable drying temperature is about 45° C.

The dried seed still contains substantially all of the linseed oil originally present in the flaxseed. This of course is a highly valuable product and at present is the constituent of flaxseed which is of greatest commercial value. In order to recover the linseed oil from the flaxseed, the mucilage-free seed is ground to a rather fine meal and the oil obtained therefrom by either expressing it under high pressure in machines which are commonly employed in the linseed oil industry, or by subjecting the meal to the action of a solvent for the oil, either continuously or in a batch type process. As examples of solvents which are applicable to the solvent extraction process may be listed dimethyl and diethyl ethers, ethanol, acetone, chlorinated dimethyl and diethyl ethers, naphtha, benzene, toluene, carbon tetrachloride, tetrachlorethane, etc. The oil extraction may be conducted either at room temperature or at elevated temperatures, preferably not above 50° C., depending upon the equipment available.

Following the removal of substantially all of the oil from the ground flaxseed, the resultant product is subjected to the action of a dilute alkali metal hydroxide solution whose normality is between about 0.5 and about 2.0 at a temperature not greater than 75° C., or to the action of other suitable protein solvents. Solutions of sodium or potassium hydroxide, alone or in the presence of 0.5 equivalent of calcium oxide or hydroxide, or barium hydroxide, are very efficient as protein solvents in this step of the process. It is desirable that the temperature during this protein extraction be maintained not greater than 75° C., and preferably at room temperature or about 25° C., in order to prevent hydrolysis or decomposition of the proteinaceous substances. It has now been found that solutions of higher alkalinity are required to extract the proteinaceous substances from oil-free linseed meals which result from the alkaline mucilage extraction process than are required for protein extraction from acid mucilage extracted flaxseed. An extraction period between about 1 and about 2 hrs. is usually sufficient to recover about 95% of the protein from flaxseed which has been subjected to acid mucilage extraction, whereas a period between three to five hrs. is required in order to recover the optimum amount of protein from flaxseed which has been subjected to alkaline mucilage extraction methods. Obviously the period of protein extraction depends upon the alkalinity of the solvent and upon the meal-to-solvent ratio. The factors recited for the mucilage extraction process are also applicable to this particular extraction.

The protein solutions prepared as described above are filtered in order to remove suspended or precipitated materials and are then treated with a suitable acidic reagent such as hydrochloric or acetic acids to give a pH between about 3.5 and about 4.0, preferably about 3.8. The latter pH produces the maximum protein precipitation and amounts to as much as 10% more than has heretofore been recovered by prior processes. The resultant precipitated protein may be readily isolated by filtration or centrifugation due to the fact that it is substantially free from contaminating mucilage. It has been found that between about 85 to 95% of the protein content of the flaxseed can be obtained by carrying out the aforementioned series of steps. Furthermore, due to the substantially pure condition of the precipitated protein, the latter may be directly subjected to hydrolysis under either acidic or alkaline conditions in order to produce either amino acid hydrolysates or individual amino acids which are inherently present in flaxseed protein.

In a preferred embodiment of the invention, whole flaxseed is agitated for about 4 hrs. with 0.3 N. sodium hydroxide solution or for about 16 hours with a 0.3 N. hydrochloric acid solution in a ratio of about 1 part by weight of flaxseed to about 12 parts by volume of said solutions. The temperature during this treatment is about 25° C. After the extraction period the seed is isolated by means of filtration or centrifuge and is suspended in about 4 volumes of water, neutralized, filtered, and dried in a suitable oven or drying mechanism at a temperature not above 50° C. The alkaline or acidic mucilage extraction solvent contains the mucilaginous substances at about 6% concentration based on the weight of the original seed. The mucilaginous substances are isolated therefrom by adjusting the pH of the solution to about 8.5 and adding about 2 volumes of a water-miscible organic solvent such as ethyl alcohol. The resultant solution is allowed to stand for several hours and the precipitated mucilaginous substances are isolated by centrifugation, or suction filtration and dried to constant weight at a temperature of about 105° C. The resultant product represents between about 90 and about 95% of the mucilaginous substances originally contained in the whole flaxseed. The dried substantially mucilage-free seed is ground and the linseed oil extracted therefrom with an organic solvent such as hexane or ethyl alcohol. The oil-free ground flaxseed meal is agitated for about 2 hrs. with a 0.5 N. sodium hydroxide solution if the mucilage was obtained by acid extraction, or for about 3 hrs. with a 1.0 N. sodium hydroxide solution if the mucilage was obtained from the whole flaxseed by alkaline extraction. A suitable ratio of sodium hydroxide solution to meal is about 100 parts by volume to 3 parts by weight. The alkaline mixture is filtered and the pH of the liquid is adjusted to about 3.8 with an acid such as hydrochloric, acetic, or sulfuric acids. The proteinaceous substances precipitate quite rapidly and may be readily isolated by means of filtration or a centrifugation. If the protein is to be marketed directly, it should be washed several times in order to remove adhering pigments and inorganic compounds. Alternatively, the proteinaceous substances may be directly subjected to hydrolysis under either acidic or alkaline conditions in order to produce protein hydrolysates from which individual amino acids may be recovered by suitable adjustment of the pH of the solution.

In order to more completely describe the nature and character of the invention but with no intention of being limited thereto, the following examples are set forth:

A mucilage extracting step on whole flaxseed was carried out as follows: About 50 g. of whole flaxseed are stirred for about 18 to 20 hrs. with about 500 cc. of the acidic and alkaline solutions as indicated in Table I. The resultant mixtures are centrifuged and the residual seed is twice re-extracted with 250 cc. portions of the indicated solvent. The temperature in each example is about 25° C. during the extraction.

TABLE I

*Mucilage extraction of whole flaxseed with water, acid and alkali*

| Example No. | Solvent Used | pH of Extract | Grams of mucilage fraction extracted from 100 grams of seed (moisture and ash-free) | | | |
|---|---|---|---|---|---|---|
| | | | 1st Extract | 2nd Extract | 3rd Extract | Total |
| 1 | Water | 5.3 | 2.0 | 0 | 0 | 2.0 |
| 2 | 0.1 N.NaOH | 11.8 | 5.9 | 0.3 | 0.3 | 6.5 |
| 3 | 0.3 N.NaOH | 12.1 | 6.8 | 0.7 | 0.1 | 7.6 |
| 4 | 0.5 N.NaOH | 12.3 | 8.1 | 0.4 | 0.1 | 8.6 |
| 5 | 2.5 N.NaOH | 11.3 | 9.4 | 1.4 | 0.1 | 10.9 |
| 6 | 0.1 N.HCl | 2.0 | 5.9 | 0 | 0 | 5.9 |
| 7 | 0.3 N.HCl | 1.2 | 6.6 | 0.8 | 0.2 | 7.6 |
| 8 | 0.5 N.HCl | 1.0 | 6.5 | 0.7 | 0.2 | 7.4 |
| 9 | 2.5 N.HCl | 0.6 | 6.9 | 0.1 | 0 | 7.0 |

Inspection of the table indicates that maximum mucilage extraction can be obtained in the first extract using either a 0.3 N. hydrochloric acid or 0.3 N. sodium hydroxide solution. The second extracts contain small amounts of the mucilage and the third extracts essentially none.

It will be apparent that in the case of the alkaline extracts that the yield of mucilage is in excess of 7.0% as the normality of the alkaline solution proceeds from about 0.3 to about 2.5. It is not certain what causes this increase of soluble material in the high alkaline ranges but it may be reasonable to assume that it is caused by solution of lignin and hemicellulose which are present in flaxseed. These two carbohydrates are insoluble in acidic, neutral, and alcoholic solutions, but become increasingly soluble as alkalinity increases. If a substantially pure mucilage fraction is desired it is obvious that either an acidic solvent or a sodium hydroxide solution whose normality is between about 0.1 and about 0.3 should be employed.

The following examples illustrate the yield of mucilage obtained by subjecting the flaxseed to the action of alkaline or acidic solvents while varying the contact time of the seed in the solvents. In all cases, about 900 cc. of 0.3 N. sodium hydroxide or 0.3 N. hydrochloric acid per 100 g. of whole flaxseed was employed. Here again the temperature in each case is about 25° C.

TABLE II

*Relationship between mucilage fraction yields and length of exposure time of whole flaxseed to 900 cc. of 0.3 N NaOH, and 0.3 N HCl, per 100 gms. of seed*

[All values are corrected for moisture and ash]

| Example No. | Solvent Used | Hours of Stirring | Grams of mucilage fraction isolated from | | |
|---|---|---|---|---|---|
| | | | 1st Extract | 2nd Extract | Total |
| 10 | 0.3 N NaOH | 1 | 4.3 | 1.0 | 5.3 |
| 11 | do | 2 | 4.0 | 0.8 | 4.8 |
| 12 | do | 3 | 5.4 | 0.7 | 6.1 |
| 13 | do | 4 | 6.2 | 0.7 | 6.9 |
| 14 | do | 7.5 | 5.7 | 0.9 | 6.6 |
| 15 | do | 16 | 6.8 | 0.7 | 7.5 |
| 16 | do | 31.5 | 6.6 | 1.0 | 7.6 |
| 17 | 0.3 N HCl | 1 | 1.8 | 0.5 | 2.3 |
| 18 | do | 2 | 3.2 | 0.3 | 3.5 |
| 19 | do | 3 | 3.2 | 0.2 | 3.4 |
| 20 | do | 4 | 4.3 | 0.6 | 4.9 |
| 21 | do | 7.5 | 4.0 | 0.4 | 4.4 |
| 22 | do | 16 | 6.6 | 1.0 | 7.6 |
| 23 | do | 31.5 | 6.4 | 0.9 | 7.3 |

The above examples illustrate the fact that by far the greater proportion of the mucilaginous substances are obtained in the first extract and that for all practical purposes the second extract is rather superfluous, except perhaps where the period of extraction is only 1 to 2 hrs. In the case of the alkaline solutions, the mucilage recovery is increased by only about 15 to 20% by employing a period of about 31.5 hrs. as compared to a 1 hr. extracting period. However, in the case of the acidic extraction, a period between 4.0 and 16 hrs. is apparently essential. Extending the extraction time beyond the 16 hr. period does not appear to be advantageous.

The following table illustrates the fact that the amount of extracting solvent is not critical in so far as the total yield of dissolved mucilage is concerned. In each case about 100 g. of whole flaxseed is agitated for about 4 hrs. with varying volumes of a 0.3 N. sodium hydroxide solution.

TABLE III

*Mucilage fraction yields from 100 grams of flaxseed stirred for 4 hours with varying volumes of 0.3 N NaOH*

[All values are corrected for moisture and ash]

| Example No. | CC. of 0.3 N NaOH used per 100 gr. of seeds | Grams of mucilage fraction isolated from | | |
|---|---|---|---|---|
| | | 1st Extract | 2nd Extract | Total |
| 24 | 500 | 5.6 | 1.6 | 7.2 |
| 25 | 700 | 6.3 | 1.0 | 7.3 |
| 26 | 900 | 6.2 | 0.7 | 6.9 |
| 27 | 1,100 | 6.5 | 0.5 | 7.0 |
| 28 | 1,400 | 6.4 | 0.4 | 6.8 |
| 29 | 1,500 | 6.6 | 0.4 | 7.0 |
| 30 | 1,600 | 6.3 | 0.4 | 6.7 |
| 31 | 1,800 | 6.5 | 0.5 | 7.0 |

Any of the substantially mucilage-free flaxseed products obtained according to the examples herein set forth may be further subjected to various steps which involve the extraction therefrom of linseed oil and proteinaceous substances. If these additional steps are to be carried out, the substantially mucilage-free seed should first be adjusted to neutrality, then dried at a temperature below 50° C. The seed is then ground and the oil extracted therefrom in a Soxhlet extractor or other suitable apparatus with ethyl ether or any suitable oil solvent as previously described. The oil extract is filtered and the solvent removed in vacuo, until a constant weight is obtained.

Included in the following table are yield and iodine number data an oil extracted from seed which has not been mucilage extracted, as well as from seed first substantially freed of mucilage. Data obtained as shown in Table IV was from oil resulting from following the above described process steps.

TABLE IV

*Oil yields and iodine numbers of the oils obtained from flaxseed, from which the mucilage was extracted with various solvents*

| Example No. | Solvent used for mucilage extraction | Gms. of oil obtained from 100 gms. of original seed | Iodine number of the linseed oil |
|---|---|---|---|
| 32 | Untreated seed | 38.6 | 178.6 |
| 33 | 0.3 N NaOH | 37.5 | 181.4 |
| 34 | 0.3 N HCl | 38.3 | 179.4 |

In appearance the oil obtained from mucilage-containing flaxseed and acid extracted flaxseed is approximately the same. In each case approximately the same amount of seed pigment was extracted into the oil. In the case of the alkali treated seed the oil was noticeably lighter in color due to reduced pigment content and only the typical yellow linseed oil color was present. It is apparent from the examples recited above that the prior extraction of the mucilaginous substances with either alkaline or acidic solutions does not appreciably alter the characteristics of the flaxseed in so far as its oil content and quality are concerned.

The protein content of the flaxseed, which is substantially free of linseed oil and mucilaginous substances, may now be extracted by treating the meal with a dilute solution of sodium hydroxide for a period of about 1 to about 5 hrs. As previously mentioned, it has been discovered that a stronger alkaline solution is required for protein recovery in the case of flaxseed which has been mucilage extracted with alkaline reagents than in the case of acid extracted flaxseed. The following table indicates the influence of length of extraction time on protein recovery from acid and alkali mucilage-extracted, oil-free flaxseed meal.

TABLE V

*Influence of length of extraction time on nitrogen peptization of acid and alkali mucilage extracted, oil-free flaxseed meal*

| Example No. | Length of extraction time (Hours) | Percentage nitrogen peptized from | |
|---|---|---|---|
| | | Acid-mucilage-meal solvent: 0.5 N NaOH | Alkali-mucilage-meal solvent: 1.0 N NaOH |
| 35 | 1 | 94.3 | 80.4 |
| 36 | 2 | 97.6 | 85.4 |
| 37 | 3 | 95.2 | 92.8 |
| 38 | 4 | 96.2 | 91.7 |
| 39 | 5 | 99.8 | 91.8 |

It is obvious from the above results that a higher concentration of alkaline reagents is required to extract the proteinaceous substances from the meal at this stage of the process than in the case of flaxseed which has been subjected to acid treatment for purposes of mucilage extraction. Furthermore apparently a longer period of extraction is required in such cases, although prolonging this extraction period beyond 3 hrs. would not greatly improve the protein yield.

The proteinaceous substances may also be extracted by employing 87% aqueous formic acid solution which will produce protein recoveries up to 99.5%, but due to economic considerations, such a procedure is not deemed advisable. Other protein solvents may also be employed.

Prior investigations have disclosed that the precipitation of dispersed flaxseed proteins from alkaline solutions occurs within a pH range of about 4.0 to 5.0. The pH of the alkaline solutions is adjusted to these values by adding thereto suitable acidic reagents such as acetic, hydrochloric, sulfuric or phosphoric acids, $SO_2$, or acidic salts. It has now been found that an optimum yield of proteinaceous substances may be obtained from the instant novel process by precipitating said protein at pH values between about 3.4 and about 4.2, more particularly about 3.8. At the latter pH value between 90 and 95% of the protein content of flaxseed may be recovered.

While certain of the above examples illustrate the use of dilute hydrochloric acid and dilute sodium hydroxide solutions of a specific concentration for purposes of mucilage extraction, it is to be understood that other concentrations of these particular mucilage solvents may be employed in the process and furthermore that other acids and bases as well as acidic and basic salts such as those previously herein described may be employed. Here again, the concentration of mucilage extraction solvent, period of contact of the solvent with the whole flaxseed, ratio of solvent to flaxseed, etc. will depend upon the nature of the reagent as well as upon this concentration. Furthermore the character and scope of the invention is not limited to the specific details herein recited in reference to each particular step of the process, but these steps may be carried out by obvious extensions and modifications of the factors recited.

Having now fully described the nature and character of the invention, what is desired to be secured by Letters Patent is:

1. A process for the extraction of mucilaginous substances from flaxseed which comprises subjecting whole flaxseed to the action of an aqueous reagent taken from the group consisting of dilute alkali metal hydroxide and dilute acidic solutions at a temperature below 100° C.

2. A process for the extraction of mucilaginous substances from flaxseed which comprises subjecting whole flaxseed to the action of a dilute aqueous solution of at least one alkali metal hydroxide at a pH of at least 8.0, at a temperature below 100° C.

3. A process for the extraction of mucilaginous substances from flaxseed which comprises subjecting whole flaxseed to the action of a dilute aqueous solution of sodium hydroxide at a pH between about 8.0 and about 12.0, at a temperature below 100° C., and recovering the mucilaginous substances from the solution.

4. A process for the extraction of mucilaginous substances from flaxseed which comprises admixing whole flaxseed with a 0.3 Normal aqueous sodium hydroxide solution in a ratio of about one part of flaxseed to about nine parts of said solution, by weight, at a temperature of about 25° C. for a period of about four hours and recovering the mucilaginous substances from the solution.

5. A process for the extraction of mucilaginous substances from flaxseed which comprises subjecting whole flaxseed to the action of at least one dilute acid at a pH less than 4.0, at a temperature below 100° C.

6. A process for the extraction of mucilaginous substances from flaxseed which comprises subjecting whole flaxseed to the action of at least one dilute acid at a pH between about 0.5 and about 4.0, at a temperature below 100° C., and recovering the mucilaginous substances from the solution.

7. A process as in claim 6 wherein the acid employed is hydrochloric acid.

8. A process as in claim 6 wherein the acid employed is sulfuric acid.

9. A process for the extraction of mucilaginous substances from flaxseed which comprises admixing whole flaxseed with an aqueous 0.3 N. hydrochloric acid solution in a ratio of about one part of flaxseed to about nine parts of said solution by weight, at a temperature of about 25° C. for a period between about seven and about sixteen hours and recovering the mucilaginous substances from the solution.

10. A process for the extraction of mucilaginous substances from flaxseed which comprises subjecting whole flaxseed to the action of a dilute mineral acid whose normality is between about 0.01 and about 2.5 at a temperature below 100° C. and recovering the mucilaginous substances from the solution.

11. A process for the extraction of mucilaginous substances from flaxseed which comprises subjecting whole flaxseed to the action of a dilute aqueous alkali metal hydroxide solution whose normality is between about 0.01 and about 2.5 at a temperature below 100° C. and recovering the mucilaginous substances from the solution.

12. The process of treating flaxseed which comprises subjecting whole flaxseed to the action of a dilute acidic solution at a temperature below 50° C., separating the resultant solution from the residue of flaxseed, extracting the oil from the said residue and recovering proteinaceous substances from the substantially oil-free residue.

13. A process which comprises subjecting whole flaxseed to the action of a dilute acidic solution, separating the resultant solution from the seed, neutralizing the substantially mucilage-free flaxseed to remove excess reagent, washing the flaxseed to free it from acid solution, drying the washed product, crushing the dried seed and removing substantially all of the oil contained therein by extraction with a solvent for the oil, treating the substantially oil-free product with a dilute alkali metal hydroxide solution whose normality is between about 0.5 and about 2.0 at a temperature not greater than 75° C., filtering the resultant protein-containing solution, neutralizing the filtrate with an acidic reagent to give a pH of between about 3.5 and about 4.0 and recovering the precipitated protein values therefrom.

BRUNO VASSEL.

REFERENCES CITED

The following references are of record in the file of this patent:

UNITED STATES PATENTS

| Number | Name | Date |
|---|---|---|
| 2,010,880 | Near et al. | Aug. 13, 1935 |

OTHER REFERENCES

Painter et al., Ind. and Eng. Chem., vol. 38, pp. 95–98, Jan. 1946.

Smith et al., Ind. and Eng. Chem., vol. 38, pp. 353–356, Mar. 1946.